(No Model.)
W. J. DANKWORTH.
HAME HOOK.
No. 444,664. Patented Jan. 13, 1891.
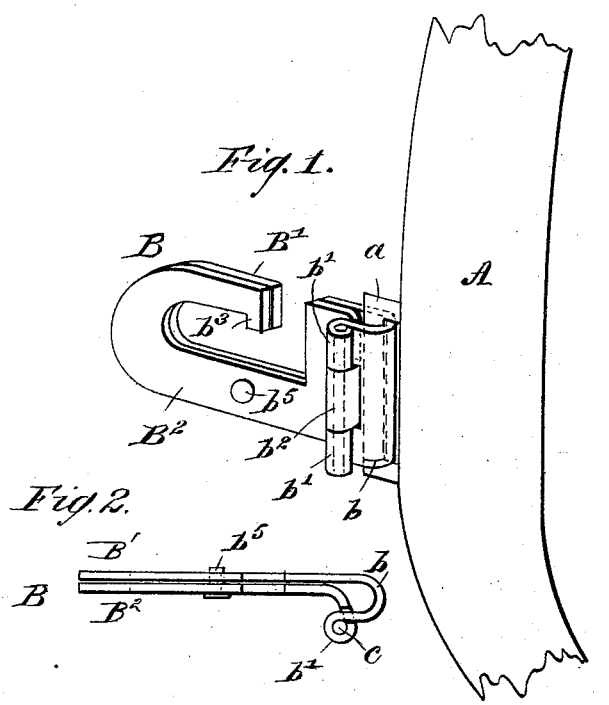
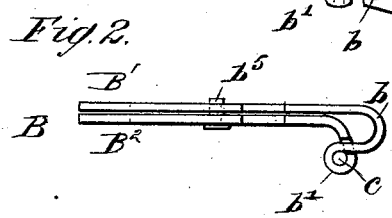
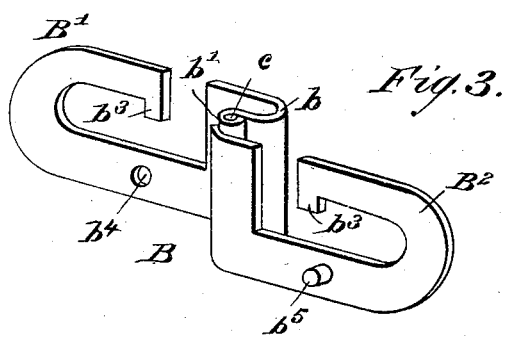
WITNESSES:
Donn Twitchell
E. M. Clark
INVENTOR:
Wm. J. Dankworth
BY
Munn & Co.
ATTORNEYS

UNITED STATES PATENT OFFICE.

WILLIAM J. DANKWORTH, OF GATESVILLE, TEXAS.

HAME-HOOK.

SPECIFICATION forming part of Letters Patent No. 444,664, dated January 13, 1891.

Application filed May 24, 1890. Serial No. 353,012. (No model.)

*To all whom it may concern:*

Be it known that I, WILLIAM J. DANKWORTH, of Gatesville, in the county of Coryell and State of Texas, have invented a new and Improved Hame-Hook, of which the following is a full, clear, and exact description.

My invention relates to improvements in hame-hooks; and the object of my invention is to produce a hook of simple construction that will be strong and durable, that may be quickly and easily applied to a harness-hame, and that will also hold a trace securely in place.

To this end my invention consists of a hook composed of two members hinged together and adapted to be clamped upon a hame-staple, one of the said members being provided with a pin adapted to project into an opening in the opposite member. This construction will be hereinafter fully described, and specifically pointed out in the claims.

Reference is to be had to the accompanying drawings, forming a part of this specification, in which similar letters of reference indicate corresponding parts in all the figures.

Figure 1 is a perspective view of the hook as applied to a hame. Fig. 2 is a plan of the hook with the members closed together, and Fig. 3 is a perspective view showing the members in open position.

In the accompanying drawings, A represents a section of the harness-hame having the usual staple $a$ projecting from the outer side thereof. The hook B is composed of two members B' and B², which are hinged together, as shown, and which must be closed, as shown in Figs. 1 and 2, to form a complete hook. The member B' is bent outwardly at its inner end to form the recess $b$, which is adapted to fit the staple $a$ and hold the hook in position thereon, and the extreme inner end of the member B' is formed into the knuckles $b'$ of the hinge. The member B² is similar in its outer contour to the member B', and its inner end is formed into the central knuckle $b^2$ of the hinged hook, said knuckle being adapted to fit between the two knuckles $b'$, and the knuckles are held in position by a suitable pintle $c$, which projects through the same. The members B' and B² are each provided with depending portions $b^3$ at their outer ends and adjacent to the entrance of the hook, said portions being adapted to hold a trace-link in position upon the hook. The member B' is provided with a transverse perforation $b^4$, and the member B² is provided with a projecting pin $b^5$, so that when the two members are closed together the pin $b^5$ will project through the perforation $b^4$, and thus hold the members together and prevent all lateral movement of the same. If desired, the pin $b^5$ may be headed after being inserted in the perforation $b^4$; but it is not usually necessary, as when the trace-link is placed upon the hook the members of the hook will be thereby held together.

To place the hook upon the hame A, the member B' is passed through the staple $a$ until the staple is inclosed by the recess $b$ of the hook. The members of the hook are then closed together and held in the manner described. It will thus be seen that the hook may be instantly placed upon or removed from the hame-staple without using a tool of any description. The hook is used in the same manner as the ordinary hame-hook. It is obvious that it may be made in any size to correspond with the hame and hame-staple to which it is to be attached. The hame-hooks may be made rights and lefts, and the recess $b$ may be given any desired shape, it being preferably nearly round.

Having thus fully described my invention, I claim as new and desire to secure by Letters Patent—

1. A hame-hook comprising two parallel hooked plates placed side by side, with their hooked portions registering to receive a trace-link, a hinge-joint connecting the inner ends of the two plates, and one of said plates being bent upon itself in rear of the hinge-joint to form a staple-receiving recess, substantially as set forth.

2. A hame-hook B, consisting in two parallel hooked plates B' B², placed side by side, with their hooked portions registering to receive a trace-link, knuckles $b'$ $b^2$, respectively, on the inner extremities of said plates, a pintle $c$, passed through the said knuckles, the bend $b$ in the rear end of plate B' forming a staple-receiving recess, and the aligned pin and aperture $b^5$ $b^4$ in the plates B² B', respectively, substantially as shown and described.

WILLIAM J. DANKWORTH.

Witnesses:
W. H. W. JONES,
E. C. MOORE.